United States Patent
Schroeder

[11] Patent Number: 6,135,211
[45] Date of Patent: Oct. 24, 2000

[54] GOPHER SOD CUTTER AND BALLER

[76] Inventor: Roger A. Schroeder, 4720 Aubuchon Rd., Hazelwood, Mo. 63042

[21] Appl. No.: 09/244,510

[22] Filed: Feb. 4, 1999

[51] Int. Cl.[7] .................................................. A01B 45/04
[52] U.S. Cl. ............................................ 172/19; 414/911
[58] Field of Search ................................. 172/19, 20, 33, 172/44; 414/911; 198/308.1; 111/901

[56] References Cited

U.S. PATENT DOCUMENTS

| | | | |
|---|---|---|---|
| 2,164,246 | 6/1939 | Kirkpatrick | 172/20 |
| 4,015,666 | 4/1977 | Brouwer et al. | 172/19 |
| 4,029,152 | 6/1977 | Gerrits | 172/19 |
| 4,553,606 | 11/1985 | Arnold | 172/19 |
| 4,777,890 | 10/1988 | Raymond | 172/19 |
| 4,778,011 | 10/1988 | Hutchison | 172/19 |
| 4,828,040 | 5/1989 | Schumacher | 172/19 |
| 4,966,239 | 10/1990 | Hutchison | 172/20 |
| 5,064,000 | 11/1991 | Dover et al. | 172/19 |
| 5,454,433 | 10/1995 | Worrel et al. | 172/20 |
| 5,755,436 | 5/1998 | Noyes, II et al. | 172/20 |

*Primary Examiner*—Victor Batson
*Attorney, Agent, or Firm*—Patent & Trademark Services; Thomas Zack; Joseph H. McGlynn

[57] ABSTRACT

A gopher sod cutter and bailer machine. A generally triangular shaped lower center blade has an adjustable depth mechanism to permit the cutting of lower sod to desired depth. On the side of the machine are two spaced disc blades whose spacing may be adjusted that determine the width of cut sod. Mounted on a string table fixed to the machine's main frame is the height adjustment column for the adjustable depth mechanism and several spindles used to supply lengths of string. Guiding pipes supply the string from each spindle to the ground after the sod has been cut and lifted by the center blade and this string wraps around the lifted cut sod to form a sod ball. A rear mounted sod spindle attached to the machine's main frame retains the formed wrapped sod ball until disconnected from its rear side mounted frame extensions for transport.

5 Claims, 4 Drawing Sheets

GOPHER SOD CUTTER AND BALLER

BACKGROUND OF THE INVENTION

Machines that are used to cut strips of grass sod from the earth have been used for many years. Generally, there are at least three cutting blades or surfaces in such machines that engage the sod and ground. The first blade or undercutting blade is used to cut beneath the in place sod while two side cutting blades are used to further cut the sod released by the first blade into strips of a desired width. In many cases all three blades are formed into a single unit with the two side blades being attached to the edges of the first blade. To reduce vibration the side blades may be reciprocated in a direction opposite to the reciprocation of the first blade.

In a variate sod cutting machine, the first or undercutting sod cutter blade is made of two split cutting blades facing each other that reciprocate in opposite directions under the sod.

The prior art also discloses a sod undercutting knife having a blade and blade holder of essentially equal length. In this configuration the replaceable blade is enclosed by the holder except for its projecting forward edge.

Whatever the means by which the sod is cut, it is afterward transported either manually or by a conveyor mechanism on the machine to a location for further processing such as being forced into a baller shaped configuration and maintained in that shape by encircling string or other material tied around the roll.

DESCRIPTION OF THE PRIOR ART

Machines that are used to cut sod from the ground are known. For example, in the Brouwer et al. invention (U.S. Pat. No. 4,015,666) a sod undercutting knife is disclosed having a front portion and an upwardly bent rear portion.

The Gerrits patent (U.S. Pat. No. 4,029,152) discloses a sod cutting machine having side cutting blades that may be reciprocated in a direction opposite to the reciprocation of the undercutting blade.

The Arnold invention, U.S. Pat. No. 4,553,606, discloses a sod cutting machine described has an undercutting sod cutter blade made of two split cutting blades facing each other that reciprocate in opposite directions under the sod.

The Hutchison reference (U.S. Pat. No. 4,778,011) discloses a sod undercutting knife described with a blade and blade holder of essentially equal length such that the blade is replaceable and enclosed by the holder except for its projecting forward edge.

The present invention relates to a sod cutter machine and baller that has a unique cutter blade and string supply system on the machine all as more fully set forth in this specification.

SUMMARY OF THE INVENTION

This invention relates sod cutting machine and baller.

It is the primary object of the present invention to provide for an improved sod cutter and baller machine having a unique undercutting cutter blade.

Another object is to provide for such a sod cutter and baller machine in which the string used to tie the cut and rolled sod is supplied by a unique string supply system.

These and other objects and advantages of the present invention will become apparent to readers from a consideration of the ensuing description and the accompanying drawings.

DESCRIPTION OF THE PREFERRED EMBODIMENT

Figure 1:
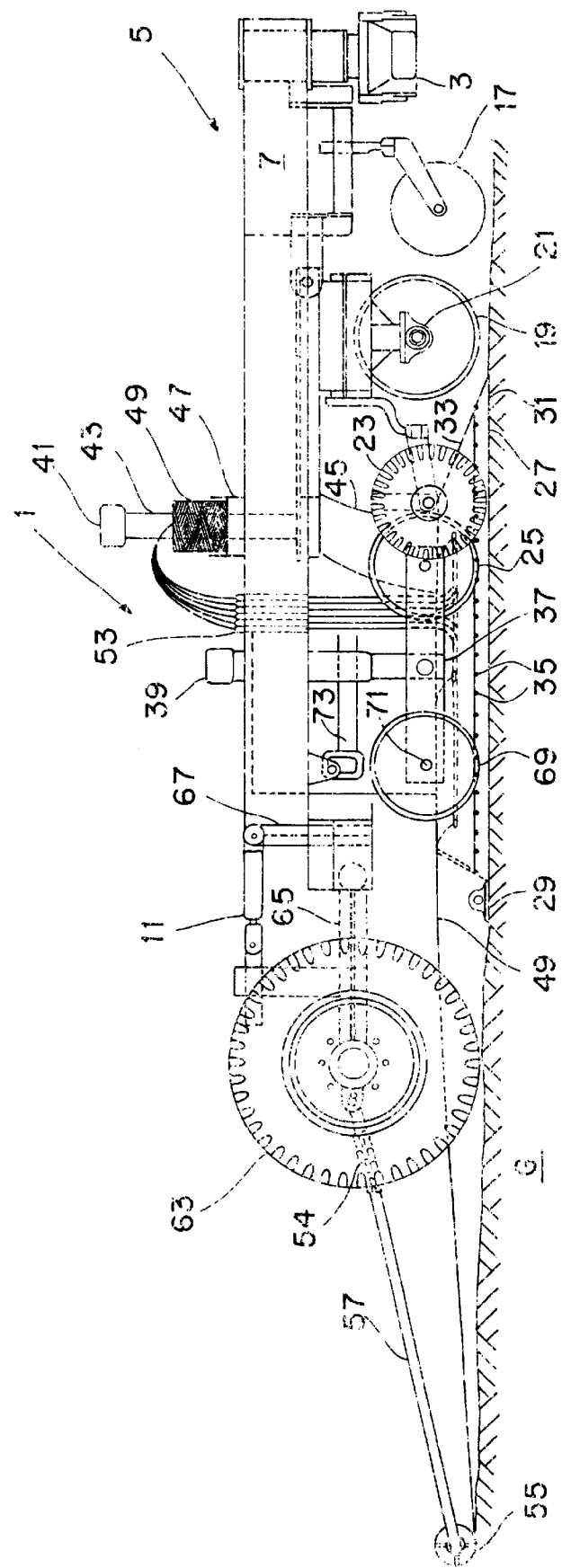
FIG. 1 is a side view of the invention.
Figure 2:
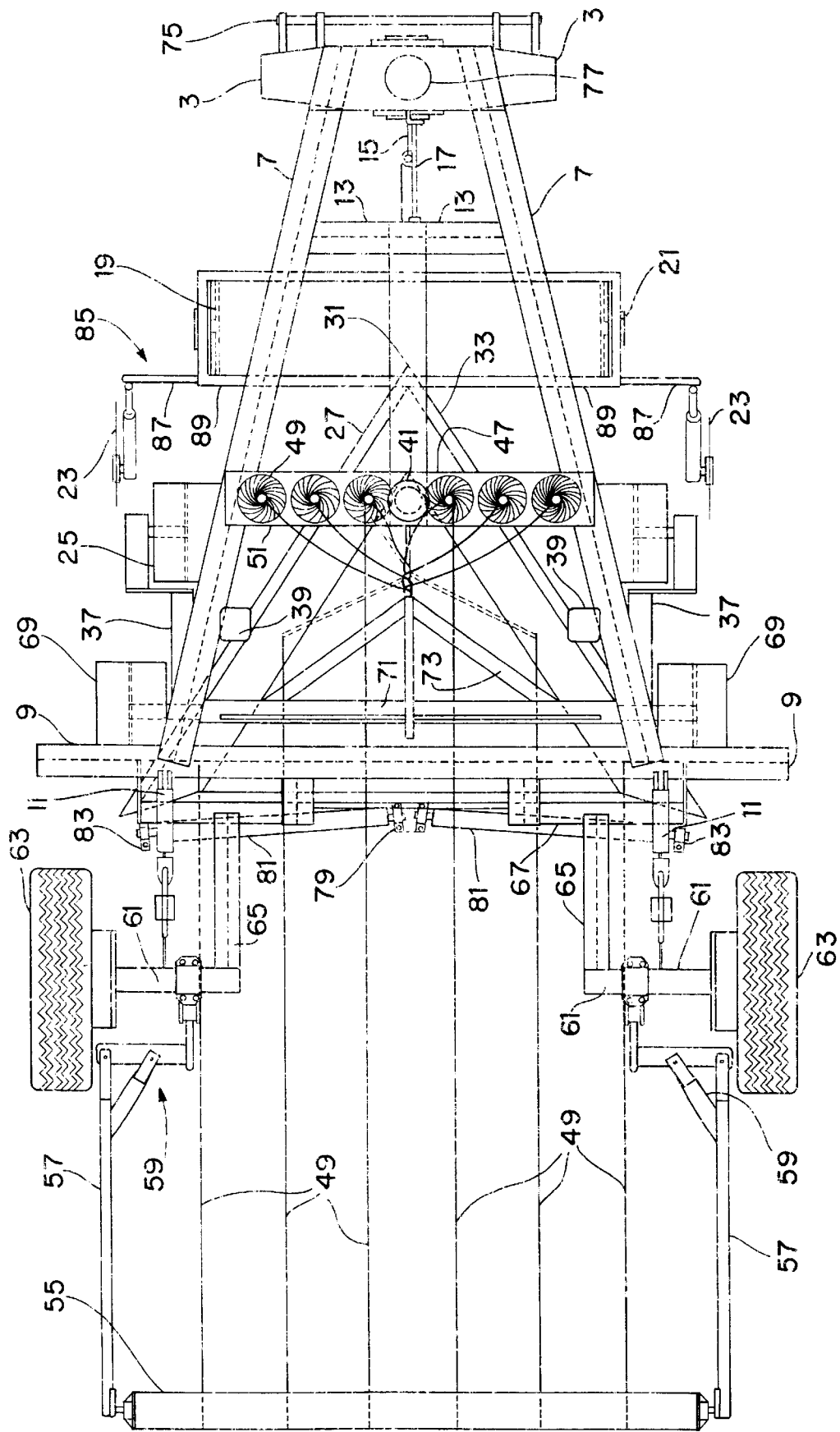
FIG. 2 is a top view of the invention illustrated in FIG. 1.

FIG. 1 is a side view of the invention's preferred embodiment. The opposite side view is essentially a mirror image. The sod machine 1 consists of a series of interrelated and inter operative components that normally would be pulled behind a motorized vehicle such as a 120 horsepower 4430 John Deere Tractor, not shown, that is attached to the sod machine at its front swivel hitch 3. A generally triangular shaped main frame support 5 has two substantially identical horizontally disposed side frame supports 7, the near one of which is shown, that extend from the front of the machine 1 where these side frame support members approach each other to vertically support the front hitch 3 to the rear of the machine where the frame side supports diverge and are connected to a lateral connecting third frame support member 9, as best shown in FIG. 2. Two spaced rear hydraulic cylinders 11 are fixed to this third frame member 9 near where the frame member is fixed to the rear end of each of the two side support frame members 7.

Depending from beneath, at approximately the mid portion of a front cross frame member 13 (as best shown in FIG. 2) and attached to a center support member 15 is a lower ground engaging front disc blade 17. First cut blade 17 is used to cut the center of a formed sod ball to split in half. The split sod ball allows a main cutter blade to go through as will be described later. Behind the disc blade 17 and further to the rear of the machine 1 is a cylindrically shaped front roller 19 that extends outwardly from beyond the sides of each of the two side frame members 7. A center bearing 21 for the front roller 19 is used to vertically support the roller and this bearing is attached to the overhead supporting main frame. Still further to the rear of the machine 1 are the two side disc blades 23 (one shown in this first figure) which are attached to the upper main frame structure by latently extending smaller frame members attached to the main frame. A center roller 25 is partially behind the side disc blades such that its rear ground engaging surface is behind each of them.

A triangular shaped lower ground engage able cutting blade 27 in between and extends from forward of the two side disc blades 23 at its apex to where its diverging rear ends at the placement roller 29. The two side blades 23 are spaced apart from each other by a distance greater than the largest rear divergent distance of the adjustable height lower cutting blade 27. The front pointed apex 31 of blade 27 extends beyond the upper blade support 33 which support has a series of spaced holes to engage the blade bolts 35 placed therein along the blade's length. These bolts allow the blade 27 to be replaced when needed rather than sharpening the blade. After the first cutting blade 17 is used to cut the sod ball in half, the same sod cut by blade 27 is lifted slightly starting at its apex 31 from the ground this permits binding string, as described later, to be placed under the cut sod.

Extending above the horizontally disposed blade support 33 are two side identical walking beams 37 each with a vertical extending member attached to it. The upper end of each vertical extension for the walking beam 37 has a depth adjustment ring 39 which ring extends around the top of the beam extension and is threaded mounted thereon. By turning the ring 39 on each of the extensions the side walking beams 37 may be individually raised or lowered as their specific ring bears against the side main frame structure.

A ring 41 is used vertically adjust the depth for the cutter blade 27. A supporting vertical center column 43 for the ring 41 extends from above the main frame 5 to where it joins with the upper support 45 for the lower blade support 33. By turning the ring 41 its attached column 43 rotates in unison in a threaded mounted hole in a cross member 47 of the main frame 5. This arrangement of cooperating parts permits the cutter blade to be raised or lowered relative to the main frame 5 by rotating the ring 41.

Located on the same cross member 47 or string table as the center column 43 are six twine supporting vertical spindles with three on each side of the center column 43. Each string 49 supporting spindle 51 is vertically disposed and spaced from the other five identical vertical string spindles 51 located on the horizontally disposed frame crossing string table. As string is dispensed from each of its individual supporting spindles, each length of separate string is fed through one of the separate vertically disposed pipes 53. After leaving a particular the pipe, the length of string 49 is wound around a latently extending single rear sod spindle 55. This roller shaped spindle 55 is supported above the ground at its two opposite ends by two elongated side mounted rigid connecting rods 57. These two side connecting rods 57 are in turn each mounted to the side brace assemblies 59. Each side brace assembly is operatively connected on its frame side to an axle 61 for each of the carrier wheels 63. These wheels along with the front hitch 3 acts like a conventional trailer to support the main frame and its depending and attached components above the ground.

The two rear mounted wheels 63 are tied into the main frame 5 by the two upper hydraulic cylinders 11 and lower axle engaging inner frame members 65 that engage depending rear main frame members 67 mounted to horizontal frame member 7.

A rear roller 69 has one of its two enlarged sides shown in FIG. 1. A supporting center axle 71 for each side roller extends across the width of the frame 5 (see FIG. 2) and is attached to the main frame by frame extensions. Also, shown in FIG. 1 are conventional supporting frame attached members 73 used to support the string pipes 53.

FIG. 2 is a top view of the invention's embodiment illustrated in FIG. 1. Many of its components have previously been described. The front hitch 3 is rigid attached to a front hitch frame 75 and has a vertically disposed pivot member 77 where it is joined to the front end of a front cross member of the main frame 5. Several other members are also more clearly shown in this second figure including the center bearing 79, the placement rollers 81, the side bearings 83 associated with the two rollers 81, and the two support frame extension assemblies 85 for the two side disc blades 23. The width or distance apart for the two side disc blades 23 may be adjusted with respect to each other by pull out or pushing in the movable tubular shaped members 87 relative to their individual mounting inner tubular frame connected supports 89. If desired locking collars may be provided at the intersection of these two members (87 and 89) to fix them in place once adjusted. The distance the disc blades 23 are apart determines the total width of sod cut and the center blade 17 cuts this cut in half. Next, the center mounted apex 31 of the undercutting blade 27 lifts and separates the cut sod and also determines the depth of cut sod. As the sod of a given width is cut and raised by the blades 17, 23 and 27, the forward motion of the pulled machine 1 lifts the stripped sod from the ground. The now raised strip of sod lying on the ground and the string is cut to a desired length by manually cutting across the raised strip's width. After the desired area of sod has been displaced from the ground G, the forward movement of the machine continues over the sod with the horizontally extended strings 49 under it. The string wraps itself around the cut sod and the formed sod ball rolls to hold the sod ball together in a tightly rolled ball. This insures the easy transport of the formed rolled ball. The two rear rods 57 can be disconnected at their engagement ends from the spindle 55. The disengaged spindle 55 stays with the sod ball for transport. To continue sod cut and balling operations a new spindle 55 is reconnected to the ends of rods 57.

Figure 3:
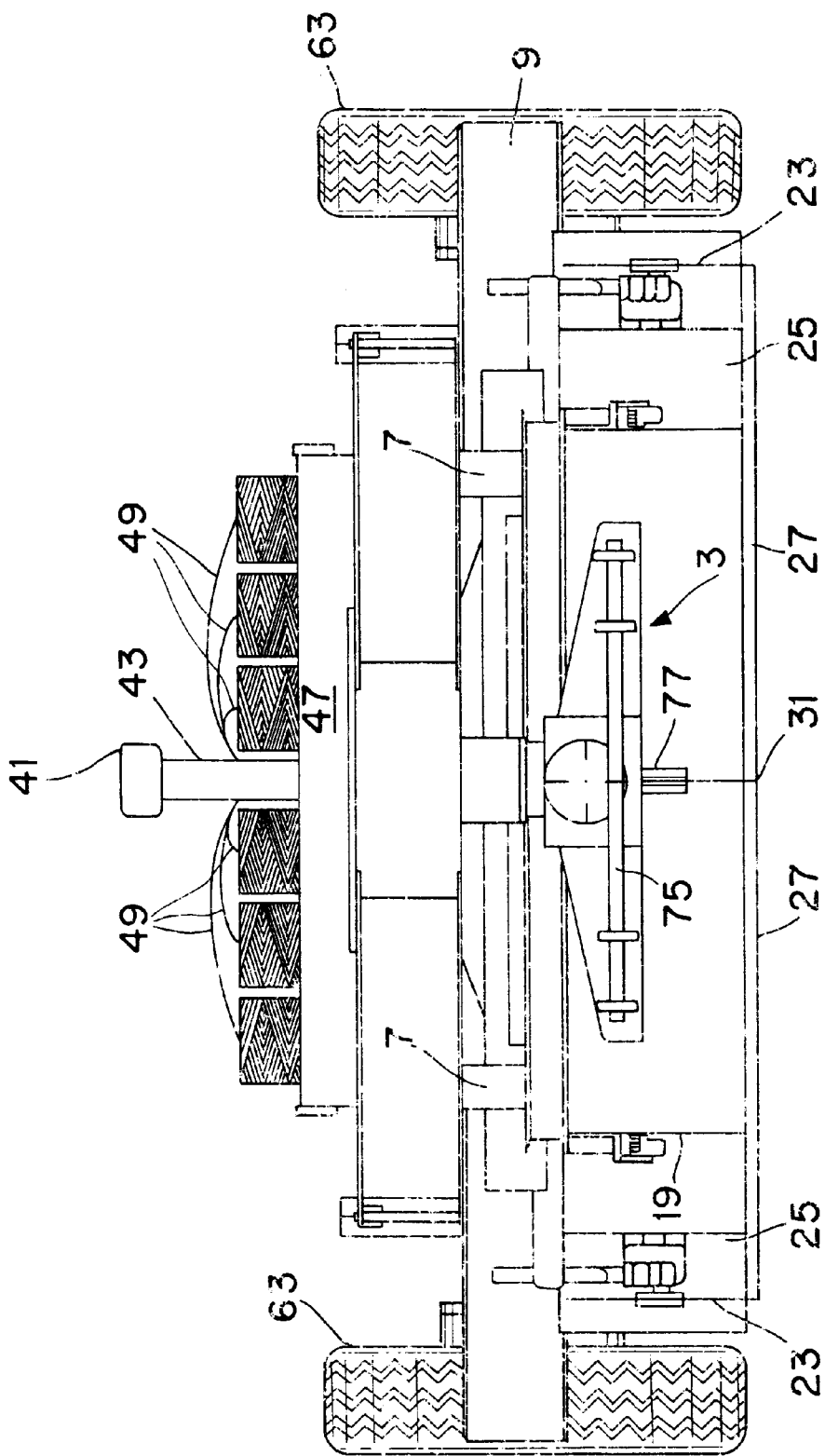
FIG. 3 is a front view of the invention depicted in FIG. 1.

FIG. 3 is a front view of the preferred embodiment depicted in FIG. 1 as viewed from the front hitch 3 looking back towards the rear sod spindle. At the lower portion is the front roller 19, used to flatten down the in situ sod, and the lower more rearward lower cutting blade 27 with its front cutting point 31. To the machine's sides are the two spaced ground engaging cutting side disc blades 23 located completely behind the front roller 19 and slightly behind the front cutting point 31 and the forward portion of the cutter blades 27. Shown elevated above the side blades 23 and the cutter blades 27 is the lateral horizontally disposed connecting third frame support member 9 and the joined two side main frame members 7. Still higher are the blade depth adjustment members 41/43, its supporting lower string table 47 and the six separate rolls of spindle supported string 49.

Figure 4:
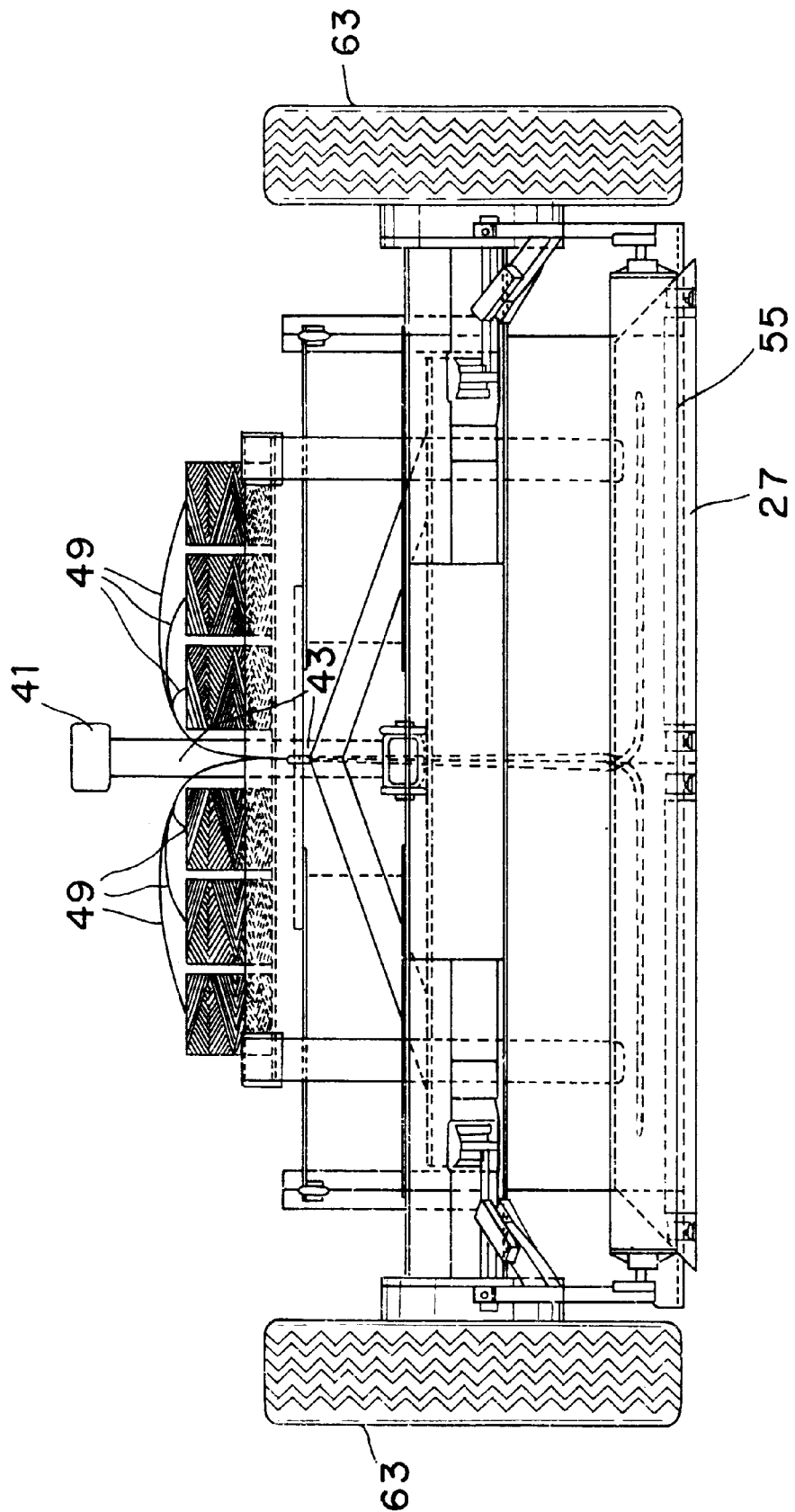
FIG. 4 is a rear view of the invention illustrated in FIG. 1.

FIG. 4 is a rear view of the embodiment illustrated in FIG. 1 as viewed looking back from rear sod spindle 55 towards the front hitch 3. This view more clearly shows the vertical depth adjustment column 43 extending from the upper end 41 to the lower member 45 that holds the cutter mount 33 and its cutter blades 27. In addition, the rear support structure has its individual components previously described is also more clearly shown. As previously shown in FIG. 2, part of the unrolled string 49 extends under the sod cut by the cutter blade 27 and this same string continues along it length to wrap around the formed sod ball. Before being wrapped around the formed sod ball, a part of the dispensed length of string sits on the ground G under the lifted cut sod by blade 27 and the forward movement of the pulling tractor allows this ground engaging string to wrap itself around the formed sod ball.

The specific type of tractor that is used to pull the invention is dependent on the amount of pulling power needed to provide the sod cut needed. Thus, for machines that provide for small sod cuts, tractors with horsepowers less than 120 may be used and for machines with larger cuts of sod greater horsepowers may be necessary.

Although the preferred embodiment of the present invention and the method of using the same has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A sod cutter and bailer machine comprising:

a main frame joined to a front hitch having two opposite side frame members and a third laterally extending rear joined frame member, said two side frame members having ends that diverge away from each other as the side frame members extend towards the third rear frame member;

a frame string support structure extending to said two frame side members for supporting a plurality of string supplying spindles over the main frame used to ball cut sod;

adjustable height lower cutting blades mounted on a vertically adjustable column mounted in a connecting main frame member, said adjustable height lower cutting blades having a front cutting point positioned forward of said string support structure and said rearward diverging side blades; and two spaced side sod cutting blades mounted to an extension connected to said main frame and depending therefrom, said side blades being spaced apart a distance greater than a largest divergent distance of the adjustable height lower cutting blades whereby cut sod under the machine has its width defined by the spacing between the spaced side blades and its depth of cut defined by the vertical adjustment of the adjustable height lower cutting blades with respect to the ground.

2. The sod cutter and bailer machine as claimed in claim 1, also including rolling members mounted to said main frame to permit said main frame and its third rear member to roll upon the ground when said machine is pulled by said front hitch.

3. The sod cutter and bailer machine as claimed in claim 2, wherein said plurality of string supplying spindles are located on both sides of said vertically adjustable column and are positioned to dispense string to the ground rearward of the cutting blade's front cutting point.

4. The sod cutter and bailer machine as claimed in claim 3, also including a rear mounted sod spindle connected by frame extensions to a rear of said main frame, said rear mounted sod spindle receiving the string supplied from said spindles to wrap around and hold balls of cut sod together.

5. The sod cutter and baller machine as claimed in claim 4, also including a front roller located forward of said adjustable height lower cutting blades and rearward of said front hitch, said front roller being capable of engaging the ground to flatten any sod thereon.

* * * * *